(12) United States Patent
Torii

(10) Patent No.: US 6,480,768 B1
(45) Date of Patent: *Nov. 12, 2002

(54) CONTROL APPARATUS FOR AUTONOMOUS TRAVELING VEHICLE AND METHOD THEREOF

(75) Inventor: Tsuyoshi Torii, Tokyo (JP)

(73) Assignee: Fuji Jukogyo Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/349,720

(22) Filed: Jul. 8, 1999

(30) Foreign Application Priority Data

Jul. 10, 1998 (JP) ............................. 10-196163

(51) Int. Cl.⁷ ..................... G01L 22/00; G05D 1/00; B62B 9/22; B60T 7/16
(52) U.S. Cl. ........................ 701/23; 701/26; 701/25; 701/27; 701/93; 701/98; 180/167; 180/168; 180/169
(58) Field of Search .................. 701/23, 25, 26, 701/27, 93, 98; 180/167, 168, 169

(56) References Cited

U.S. PATENT DOCUMENTS

| | | | |
|---|---|---|---|
| 5,079,706 A | | 1/1992 | Yamaguchi et al. ........... 701/23 |
| 5,155,684 A | | 10/1992 | Burke et al. .................. 701/25 |
| 5,319,556 A | * | 6/1994 | Bessacini ..................... 701/21 |
| 5,563,786 A | * | 10/1996 | Torii ........................... 701/23 |
| 6,038,502 A | * | 3/2000 | Sudo ........................... 701/23 |
| 6,044,312 A | * | 3/2000 | Sudo et al. .................. 701/25 |

FOREIGN PATENT DOCUMENTS

| | | |
|---|---|---|
| DE | 4138270 | 5/1993 |
| EP | 0490736 | 6/1992 |
| JP | 59-105112 | 6/1984 |
| JP | 3-135606 | 6/1991 |

OTHER PUBLICATIONS

Patent Abstracts of Japan, Japanese Publication No. 59105112.

* cited by examiner

Primary Examiner—Jacques H. Louis-Jacques
Assistant Examiner—Brian Broadhead
(74) Attorney, Agent, or Firm—Smith, Gambrell & Russell, LLP

(57) ABSTRACT

A control apparatus and method for an autonomous traveling vehicle having a teaching mode in which a vehicle position and a vehicle azimuth in respective points on a running path are memorized and a play-back mode in which the vehicle is operated autonomously based on the vehicle position and vehicle azimuth memorized in the teaching mode comprises a virtual traction point establishing means for establishing a virtual traction point located away from a vehicle position by a specified distance in a direction of a vehicle azimuth, a current vehicle position determining means for determining a current vehicle position corresponding to the vehicle position in a play-back mode, a target azimuth calculating means for calculating a target azimuth based on a positional relationship between the current vehicle position and the virtual traction point, a vehicle steering means for steering the vehicle in a direction of the target azimuth in the play-back mode and a vehicle speed control means for controlling a vehicle speed such that a distance between the virtual traction point and the vehicle comes within a specified range in the play-back mode.

15 Claims, 10 Drawing Sheets

CONTROL APPARATUS FOR AUTONOMOUS TRAVELING VEHICLE AND METHOD THEREOF

BACKGROUND OF THE INVENTION

1. Field of the Invention

The present invention relates to a control apparatus and method for an autonomous traveling vehicle and more specifically to a control apparatus having a teaching mode in which the vehicle travels while its own position and direction at a plurality of points on a running path are memorized and a playback mode in which the vehicle travels while the running path memorized in the teaching mode is played back.

2. Prior Art

In recent y ears, computer controlled, self guiding, 16 unmanned operated, autonomously traveling vehicles have been developed for cutting grasses, mowing lawn or doing other works in fields such as golf courses, banks of rivers, parks and the like. Many of such autonomous vehicles, since they repeat the same works in the same areas in most cases, introduce so-called teaching-and-playing back control method in which the vehicle travels autonomously by playing back the running path which have been memorized beforehand.

For example, Japanese Patent Application Laid-open No. Toku-Kai-Sho 59-105112 discloses a technique in which a distance between a next target point and a previous target point, a reference azimuth which is an angle of the running direction with respect to the direction of earth magnetism and a running azimuth which is an angle of the running direction with respect to the direction of the next target point, have been taught beforehand and when the vehicle runs in the play-back mode, these data are read out. The vehicle runs while correcting a discrepancy produced between these data and the present position.

Further, Japanese Patent Application Laid-open No. Toku-Kai-Hei 3-135606 discloses a technique in which a reference azimuth of a working vehicle is established by a teaching including a manual operation of the vehicle.

However, since sensors for detecting the vehicle position have measuring errors, the data containing the measuring errors of the sensor are memorized at teaching.

Hence, an attempt to play-back a running path with fidelity by minimizing the deviation between the vehicle position detected by the sensors and the vehicle position acquired by teaching produces an increased steering gain and as a result the measuring errors of the sensors generates fluctuations in the steering system as shown in FIG. 11.

SUMMARY OF THE INVENTION

The present invention is intended to obviate the aforesaid problem of the prior arts and it is an object of the present invention to provide a control apparatus of an autonomous traveling vehicle capable of playing back a running path acquired by teaching with an excellent steering stability without increasing tracing errors due to the measuring errors of the sensors.

To achieve the object, the present invention comprises a virtual traction point establishing means for establishing a virtual traction point located away from a vehicle position by a specified distance in a direction of a vehicle azimuth, a current vehicle position determining means for determining a current vehicle position corresponding to the vehicle position in a play-back mode, a target azimuth calculating means for calculating a target azimuth based on a positional relationship between the current vehicle position and the virtual traction point, a vehicle steering means for steering the vehicle in a direction of the target azimuth in the play-back mode and a vehicle speed control means for controlling a vehicle speed such that a distance between the virtual traction point and the vehicle comes within a specified range in the play-back mode.

DESCRIPTION OF PREFERRED EMBODIMENTS

Figure 2A:
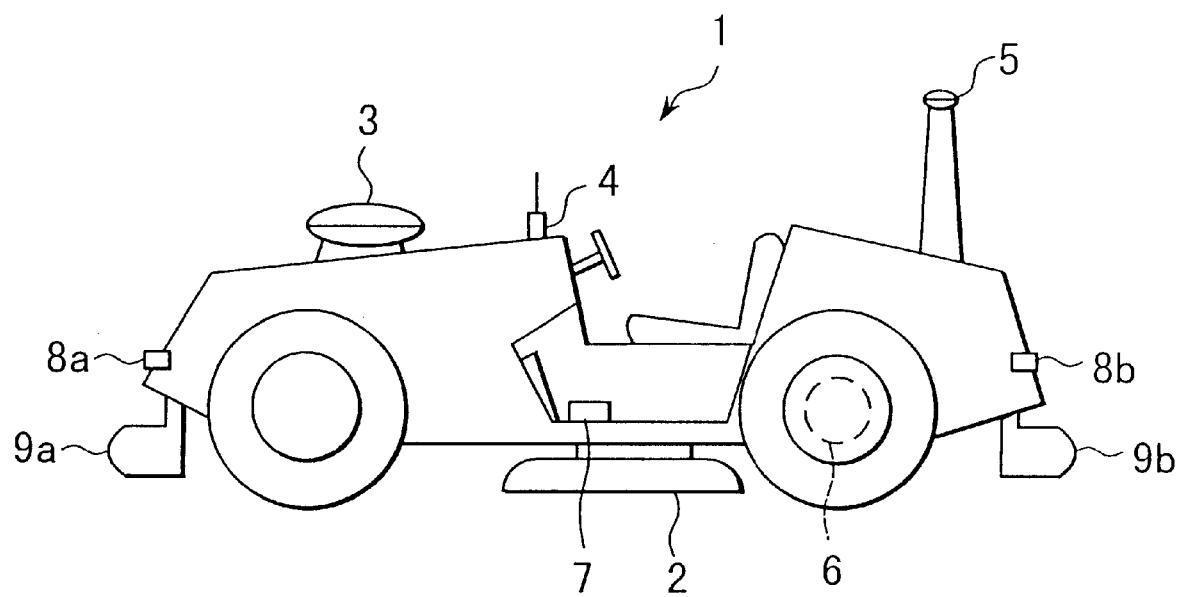
FIG. 2a is a schematic view of an autonomous lawn mowing vehicle having a D-GPS mobile station.

Referring now to FIG. 2a, numeral 1 denotes an autonomously traveling and working vehicle which can be propelled unmannedly. In this embodiment, the autonomously traveling and working vehicle 1 is a lawn mowing vehicle doing works such as cutting grasses and lawn with a blade 2 provided underneath the vehicle body. This lawn mowing vehicle 1 is propelled by a hydrostatic type transmission (hereinafter referred to as HST) using a cam plate type axial piston pump motor driven by an engine and is steered by rear wheels.

Further, the lawn mowing vehicle 1 incorporates miscellaneous apparatuses related to detecting the vehicle position, such as a satellite radio receiver for measuring the vehicle position based on the radio wave from satellites, a dead reckoning navigation sensor for measuring the current position of the vehicle based on past running traces, sensors for detecting obstacles and the like.

The satellite radio receiver used in this embodiment is a GPS (Global Positioning System) receiver for identifying the position by receiving radio waves from GPS satellites and more specifically so-called Differential GPS receiver (hereinafter referred to as D-GPS) in which the position is observed at a known stationary station and correction information (differential information) is fed back to a mobile station (lawn mowing vehicle).

Figure 2B:
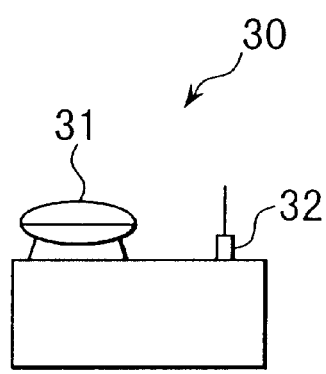
FIG. 2b is a schematic view of a D-GPS stationary station.
Figure 3:
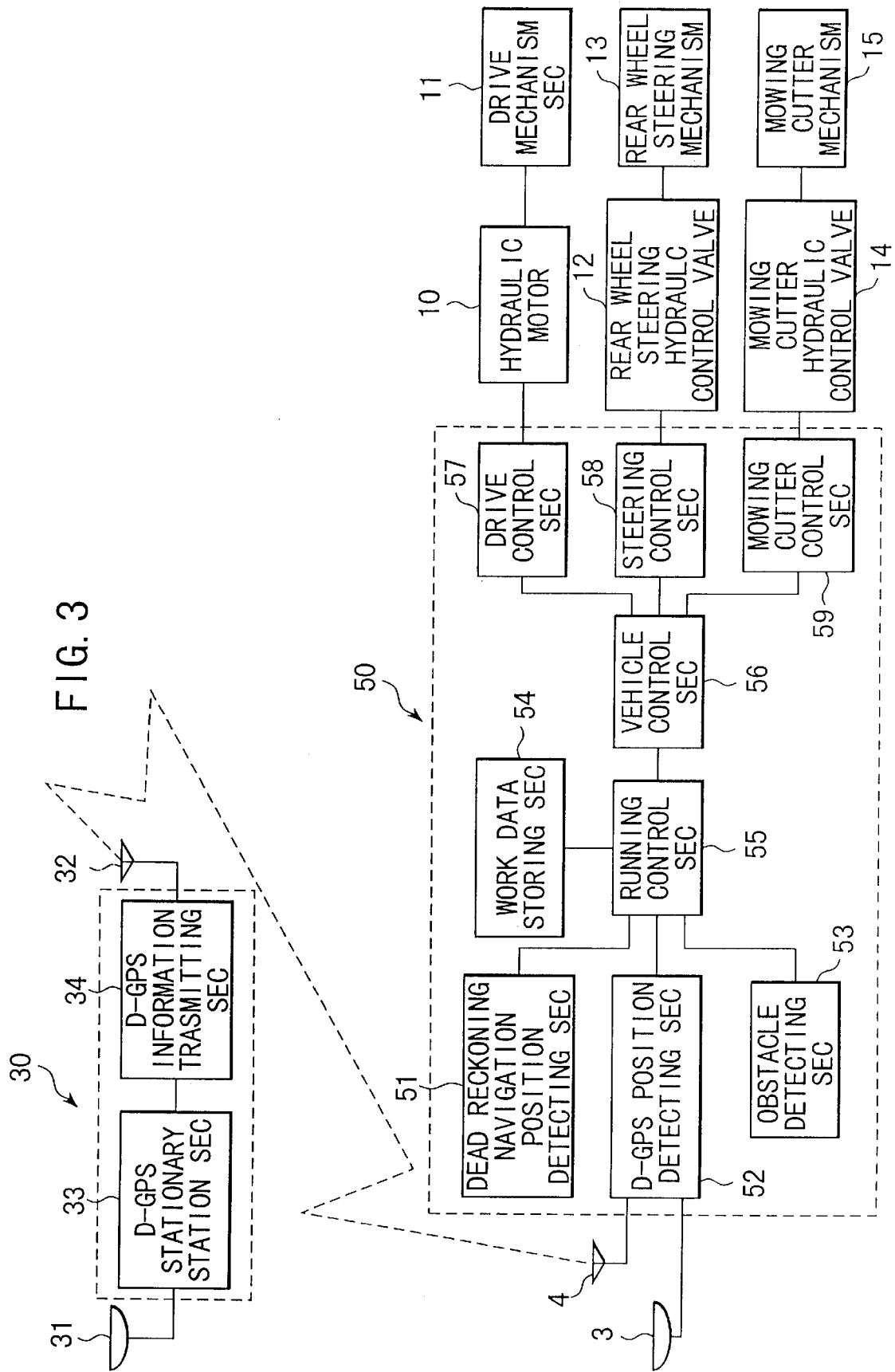
FIG. 3 is a block diagram of a control apparatus.

Accordingly, the lawn mowing vehicle 1 is equipped with an antenna 3 for the GPS receiver and an antenna 4 for the radio receiver to receive the differential information from the stationary station. Further, as shown in FIG. 2b, a stationary station 30 which is located at a known point is equipped with an antenna 31 for the GPS receiver of the stationary station and an antenna 32 for sending differential information to the radio receiver of the mobile station.

As for the dead reckoning navigation sensor, the lawn mowing vehicle 1 is equipped with a biaxial type earth magnetism sensor 5 and a wheel encoder 6. Further, in order to correct the output of the earth magnetism sensor 5, a tilt sensor 7 for detecting a roll angle and a pitch angle is disposed at the center of the vehicle. Further, as for the obstacle detecting sensors, noncontact type sensors 8a, 8b such as ultrasonic sensors or optical sensors are mounted at the front and rear portions of the vehicle 1 and additionally contact type sensors 9a, 9b using micro-switches and the like are incorporated at the front and rear ends of the vehicle 1.

The lawn mowing vehicle 1 is controlled by a control apparatus 50 composed of micro-computers and the like. The control apparatus 50 comprises a dead reckoning navigation position detecting section 51 for finding the position based on signals from the earth magnetism sensor 5 and the wheel encoder 6, a D-GPS position detecting section 52 for finding the position based on information sent from a group of satellites, an obstacle detecting section 53 for detecting obstacles based on signals from the noncontact type sensors 8a, 8b and the contact type sensors 9a, 9b and a work data storing section 54 for storing data of miscellaneous works and work data maps. Further, the control apparatus 50 includes a running control section 55 for performing the running control using the data from the detecting sections 51, 52, 53 and the data from the work data storing section 54, a vehicle control section 56 for performing the vehicle control according to the instructions of the running control section 55, a drive control section 57 for driving the vehicle based on the output from the vehicle control section 56, a steering control section 58, a mowing cutter control section 59 and the like.

In the dead reckoning navigation position detecting section 51, the vehicle speed detected by the wheel encoder 6 is integrated to obtain the traveling distance and at the same time the running direction is detected based on the output of the earth magnetism sensor 5. In integrating the traveling distance, the change of the running direction is taken into consideration and thus, by accumulating the distance from the reference point whose position is known, the present position of the vehicle 1 can be found. The position data is outputted to the running control section 55. Errors caused by road gradients in detecting azimuth are corrected based on the roll and pitch angles data detected by the tilt sensor 7. In this case, in place of the combination of the earth magnetism sensor 5 and the wheel encoder 6, a gyroscope and the like may be used to detect the running direction of the vehicle.

In the D-GPS position detecting section 52, the position of the vehicle 1 is found based on the navigation messages obtained through the GPS receiver of the mobile station from a group of satellites (at least four satellites in performing a three-dimensional positioning and at least three satellites in perfoming a two-dimensional positioning are needed), for example, messages of correction coefficients of satellite clocks, orbital information, calender of satellites, arrangements of satellites and the like and on the differential information obtained through the radio communication device from the stationary station 30. Thus obtained position data is outputted to the running control section 55.

The stationary station 30 comprises a D-GPS stationary station section 33 having a stationary station GPS radio receiver, a D-GPS information transmitting section 34 for transmitting the differential information from the D-GPS stationary station section 33 and the like. The D-GPS stationary station section 34 processes the position information from the group of GPS satellites to produce a differential correction data. This differential correction data is transformed into a packet data for radio communication in the D-GPS information transmitting section 34 and transmitted to the D-GPS position detecting section 52 of the lawn mowing vehicle 1.

In this embodiment, the D-GPS stationary station 30 has been described as an exclusive use for the autonomous vehicle 1, however existing D-GPS stationary stations having a radio station transmitting differential information or existing D-GPS stationary station differential information through communication satellites may be employed for this purpose.

On the other hand, in the obstacle detecting section 53, unforeseen obstacles are detected by the noncontact type sensors 8a, 8b and the contact type sensors 9a, 9b and detection signals are outputted to the running control section 55.

The work data storing section 54 stores fixed data such as terrain data of respective work areas in which the mowing operation is performed and terrain data of the whole area, data processed by signals from sensors, position data by D-GPS method, position data by the dead reckoning navigation method, correction data used in the combined method of the D-GPS/dead reckoning navigation, data of the present vehicle position calculated based on this correction data, data in the teaching mode, and the like.

On the other hand, in the running control section 55, to cope with the reduced positioning accuracy of the D-GPS method due to the lack of available satellites or the degraded radio receiving state, the difference between the position data from the D-GPS position detecting section 52 and the position data from the dead reckoning navigation position detecting section 51 is accumulated and averaged to produce an averaged value. Then, the position data from the dead reckoning navigation position detecting section 51 is corrected by the averaged value to calculate a present vehicle position. Further, the deviation of the present vehicle position from the target position is calculated with reference to the data of the work data storing section 54 to determine instructions to be sent to the vehicle control section 56. When the obstacle detecting section 54 detects an obstacle, the running control section 55 sends an instruction to stop the vehicle to the vehicle control section 56.

In this embodiment, the position of the mowing vehicle 1 is expressed on the coordinate system having an axis of abscissa indicating east and an axis of ordinate indicating north, letting its absolute origin be the position of the D-GPS stationary station and the azimuth angle of the vehicle is measured in the clockwise direction from the base line of the axis of ordinate (north).

In the vehicle control section 56, the respective instructions from the running control section 55 are converted into the specific amount of instruction and are outputted to the drive control section 57, the steering control section 58 and the mowing cutter control section 59. The drive control section 57 controls a hydraulic motor 10 for generating hydraulic pressure to drive a drive mechanism section 11 such as a throttle actuator for controlling the engine output, a brake actuator and a hydraulic control actuator of HST. Further, the steering control section 58 controls to drive a rear wheel steering mechanism 13 through a rear wheel steering hydraulic control valve 12 and the mowing cutter control section 59 controls a mowing cutter mechanism 15 through a mowing cutter hydraulic control valve 14.

The control apparatus 50 has two selectable modes, one is a teaching mode wherein the vehicle is manually operated while courses are memorized, the other is a play-back mode wherein the vehicle is autonomously operated while these memorized courses being played back. When the teaching mode is selected, a driver of the mowing vehicle 1 operates a selector for teaching mode and numbers the teaching mode. During the teaching mode, the driver manually operates the vehicle while gathering data such as vehicle positions, vehicle azimuth, forward running, backward running and the like at a specified interval and the control apparatus 50 gathers all data of the teaching mode. Further, also work data such as data as to where the cutter 2 is lifted down, where it is lifted up, where mowing is started are sampled or the revolution speed of the cutter.

When a selector is switched to the play-back mode and the number of the teaching mode is designated, a play-back running is carried out autonomously according to the teaching data of the designated number. That is, the vehicle travels according to the traces taken in the teaching mode and works according to the sequence taught in the teaching mode.

Next, the control processes in the control apparatus 50 will be described with reference to flow charts shown in FIGS. 4 through 6.

Figure 4:
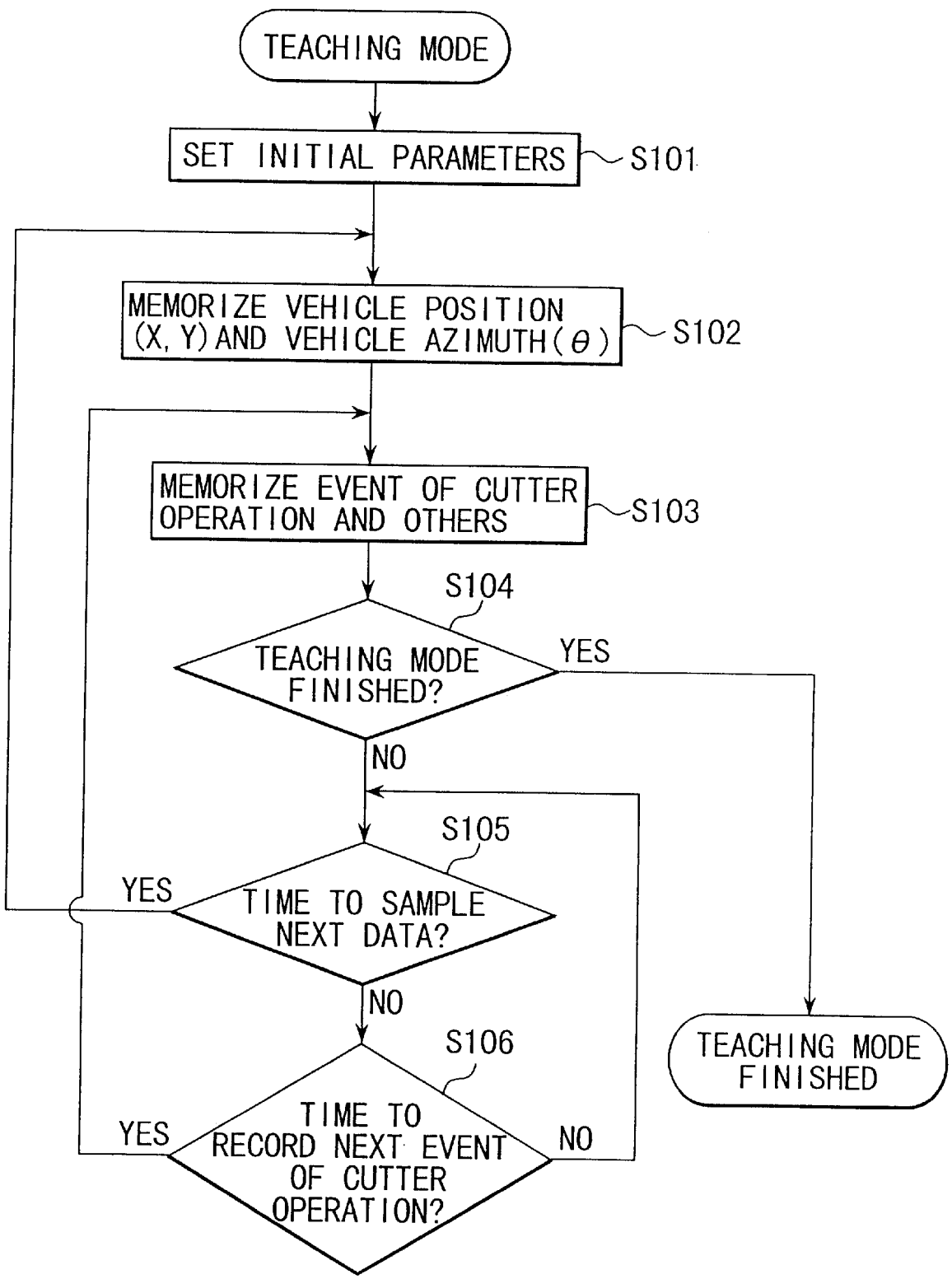
FIG. 4 is a flowchart showing a control routine at a teaching mode.

FIG. 4 shows a control routine to be executed in the teaching mode, in which at a step S101 initial parameters for the teaching mode are set. These initial parameters include a sampling interval ttime composed of a multiple of a specified unit time (for example 10 msec), an initial position (Xini, Yini) of the vehicle 1 at the start of the teaching mode and the like.

Next, the program goes to S102 where the control apparatus 50 memorizes running data such as a current position (Xorg, Yorg) of the vehicle 1 obtained according to the combined method of the D-GPS and the dead reckoning navigation, a vehicle azimuth θ obtained from the output of the earth magnetism sensor 5, a running direction (forward or reverse) and the like. Although actually the position of the vehicle 1 is memorized as a deviation amount from the initial position (Xini, Yini) at the start of the teaching mode to save memories, in this specification, in order to simplify the explanation, the position of the vehicle 1 is described as a coordinate position (Xorg, Yorg) from the coordinate origin (the position where the D-GPS stationary station is located).

Further, the running direction (forward or reverse) is judged by the state of a pedal (HST pedal) connected with a swash plate of the HST. Since the HST mounted on the mowing vehicle 1 in this embodiment is constituted such that a tilt angle of a swash plate of the HST is proportional to the vehicle speed and also the changeover from forward to reverse and vice versa is performed by changing the supplying direction of hydraulic pressure, the position of the HST pedal tells a running direction (forward, reverse and stop).

Further, at a step S103, an existence or nonexistence of the event of the cutter operation, the kind of the event (lift-up, lift-down, normal operation, reverse operation, stop and the like) and the time of the event, are read from the state of the operation switch (not shown) for the cutter and memorized.

At a step S104, it is checked from the state of the switch on the operation panel (not sown) whether or not the teaching mode is finished. In case where the teaching mode is not yet finished, the program goes to a step S105 where it is checked whether or not it reaches a time to sample the next running data.

If it has not yet reached the sampling time, at a step S106 it is checked whether or not it reaches a time to record the next cutter operation event. If it has not yet reached the recording time, the program goes back to the step S105 and if it has reached the recording time, the program goes back to the step S103 where the change of the event or a new generation of the event are recorded.

Then, the program goes to the step S104 and if the teaching mode is not yet finished, it is checked at the step S105 whether or not it reaches a time to sample the next running data. If it has reached the sampling time, the program goes back to the step S102 where the next running data is sampled.

The cutter operation event, since it generates arbitrarily, is recorded at a shorter interval than that of a sampling interval of the running data. For example, in case where the unit time of the sampling interval is 10 milli-seconds and ttime=100, the cutter operation event is recorded every 10 milli-seconds and the running data is recorded every 1 second (10 milli-seconds×100).

Foregoing processes are repeated to sample the running data and to record the respective cutter operation events and when the teaching mode is finished at S104, an end mark is attached to the end of the last teaching data thus sampled and the program leaves the routine of the teaching mode.

Figure 7:
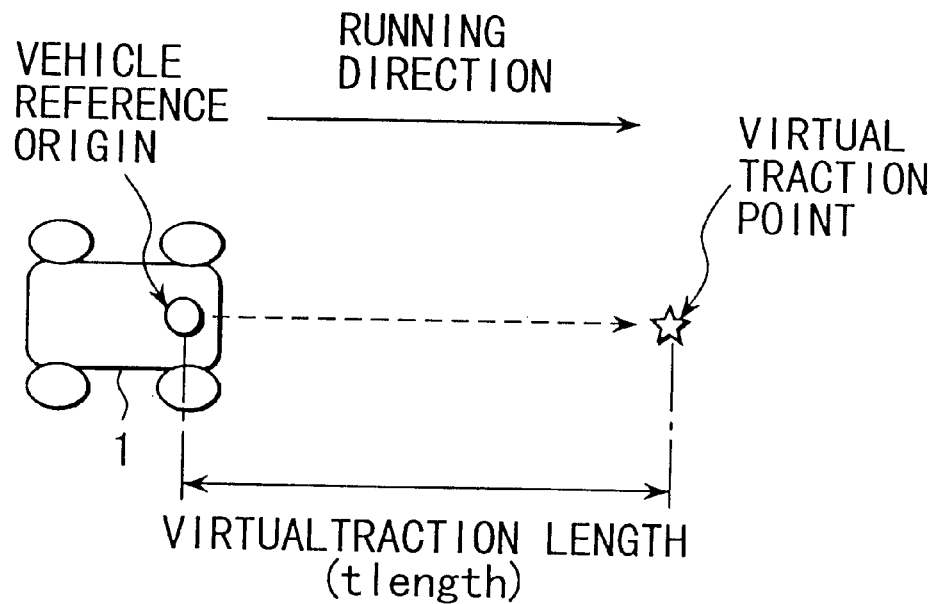
FIG. 7 is an explanatory view of a virtual traction point.

Describing the processes in the play-back mode, the running path of the mowing vehicle 1 at playing-back is formed successively by using a virtual traction point VTR but not a vehicle reference origin as control targets. As shown in FIG. 7, the virtual traction point VTR is a target point which is established in a virtual fashion in a position being apart from the vehicle reference origin by a virtual traction length "tlength" in the vehicle running direction. The position (Xvtp, Yvtp) of the virtual traction point is calculated using the sampled position (Xorg, Yorg) of the vehicle and the azimuth θ of the vehicle according to the following equations (1), (2).

$$X vtp = X org + t length * \sin \theta \quad (1)$$

$$Y vtp = Y org + t length * \cos \theta \quad (2)$$

Figure 1:
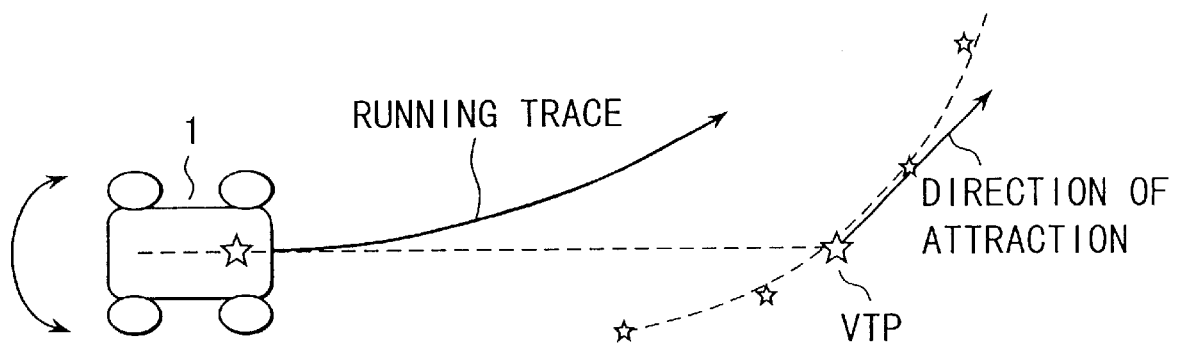
FIG. 1 is a schematic view showing a play-back of a running path by virtual traction points (VTP)

Further, at playing-back, as shown in FIG. 1, the vehicle 1 behaves as if it is attracted by the virtual traction point VTP. Then, if the vehicle position at playing-back is deviated from the vehicle position at teaching, the steering control is performed in the direction of a straight line connecting the vehicle position at playing-back and the virtual traction point VTP and the trace at teaching is played-back.

Figure 8:
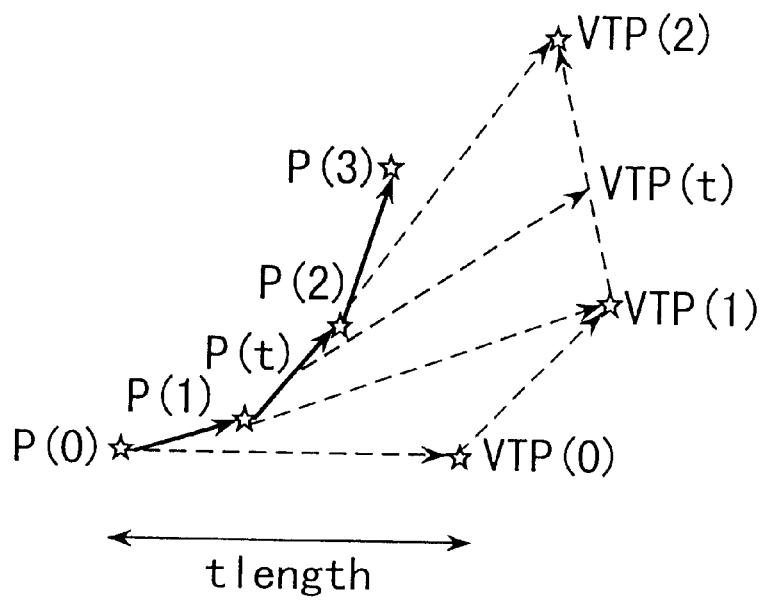
FIG. 8 is an explanatory view showing a virtual traction point corresponding to a vehicle position having the same play-back pointer.

That is, at playing-back, as shown in FIG. 8, the virtual traction point VTP(t) is calculated successively every time pointer (play-back pointer) t (t=0, 1, 2, 3, . . . ) based on the vehicle position P(t) and the vehicle azimuth θ (t) that are sampled at the teaching mode, the steering amount and the vehicle speed being controlled with respect to the calculated virtual traction point VTP (t). Since this control is the same as the one about the displacement between two points, the steering error can be minimized in tracing the path.

Figure 5:
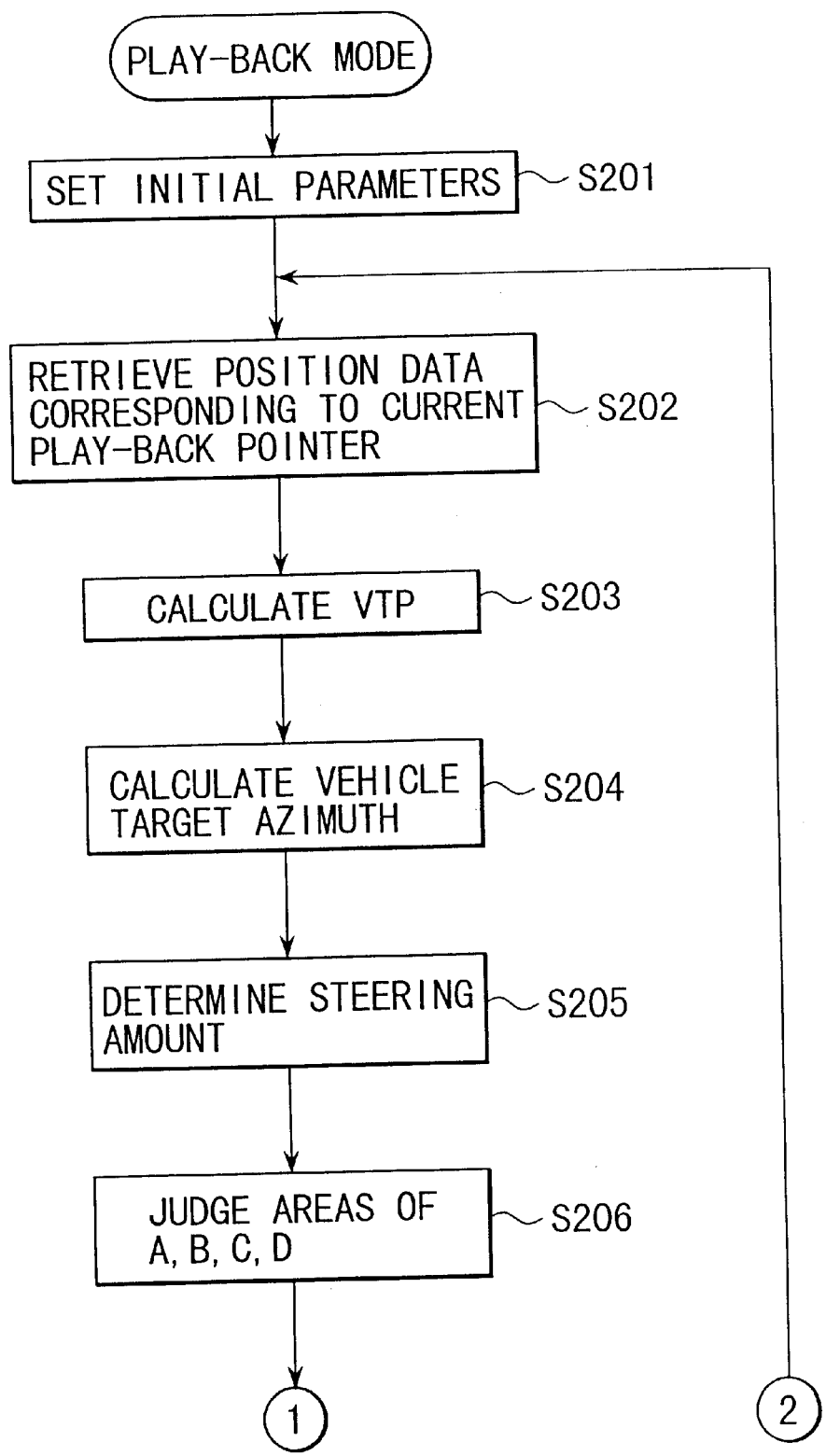
FIG. 5 is a flowchart showing a control routine at a play-back mode.
Figure 6:
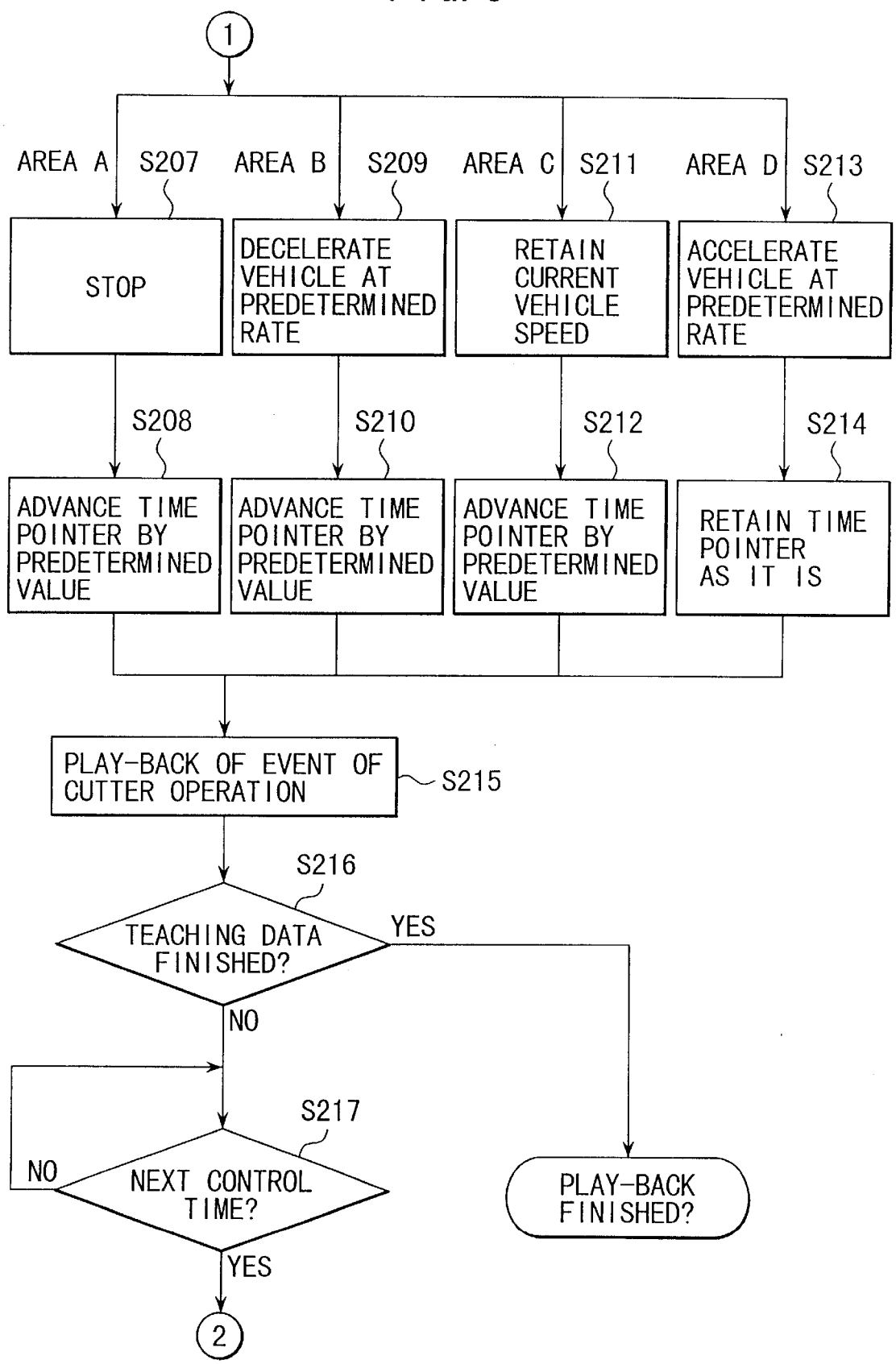
FIG. 6 is a flowchart showing a control routine continued from FIG. 5.

Describing the control routine of the play-back mode with reference to FIGS. 5 and 6, first at a step S201, initial parameters are set. Those parameters include a pbtime of a control interval at playing-back, a tlength of a distance from the teaching data to the virtual traction point VTP, a pblength of a distance to an inposition area at playing back, a pbinpos indicating a size of an inposition area at playing-back, a pbstop indicating a size of a deceleration area in performing a deceleration control at playing-back, a pbacc corresponding to one-step amount of the pedal angle of the HST and the like.

In executing a play-back instruction, the teaching number and the maximum depressing amount of the HST pedal are required as operand. Once the maximum depressing amount of the HST pedal is determined, the acceleration value in the speed control is restricted irrespective of the content of the teaching data.

Next, the program goes to a step S202 in which referring to a time pointer (play-back pointer)t in the control routine, the position data corresponding to the current pointer t is retrieved from the teaching data stored every sampling interval ttime. In case where the position data corresponding to the current play-back pointer can not found because the control interval pbtime at playing-back is shorter than the sampling interval at teaching, applying a linear interpolation between two adjacent teaching data, thus obtained interpolated data is regarded as a teaching data corresponding to the current play-back pointer t.

At the next step S203, using the vehicle position (Xorg, Yorg) corresponding to the play-back pointer t, the vehicle azimuth θ and the virtual traction length tlength, the position (Xvtp, Yvtp) of the virtual traction point VTP at the play-back pointer t is calculated according to the foregoing equations (1) (2).

Further, the program goes to a step S204 where a vehicle target azimuth is calculated based on the current vehicle position (X, Y) of the vehicle 1 which is measured by the combination of the D-GPS and the dead reckoning navigation method and the virtual traction point (Xvtp, Yvtp). Then, at a step S205 a steering amount is determined based on the calculated vehicle target azimuth and the current vehicle azimuth and is outputted to the steering control section 58. The steering control section 58 controls the rear wheel steering mechanism 13 through the rear wheel steering hydraulic control valve 12 to steer the steering wheels (in this embodiment rear wheels).

Figure 9:
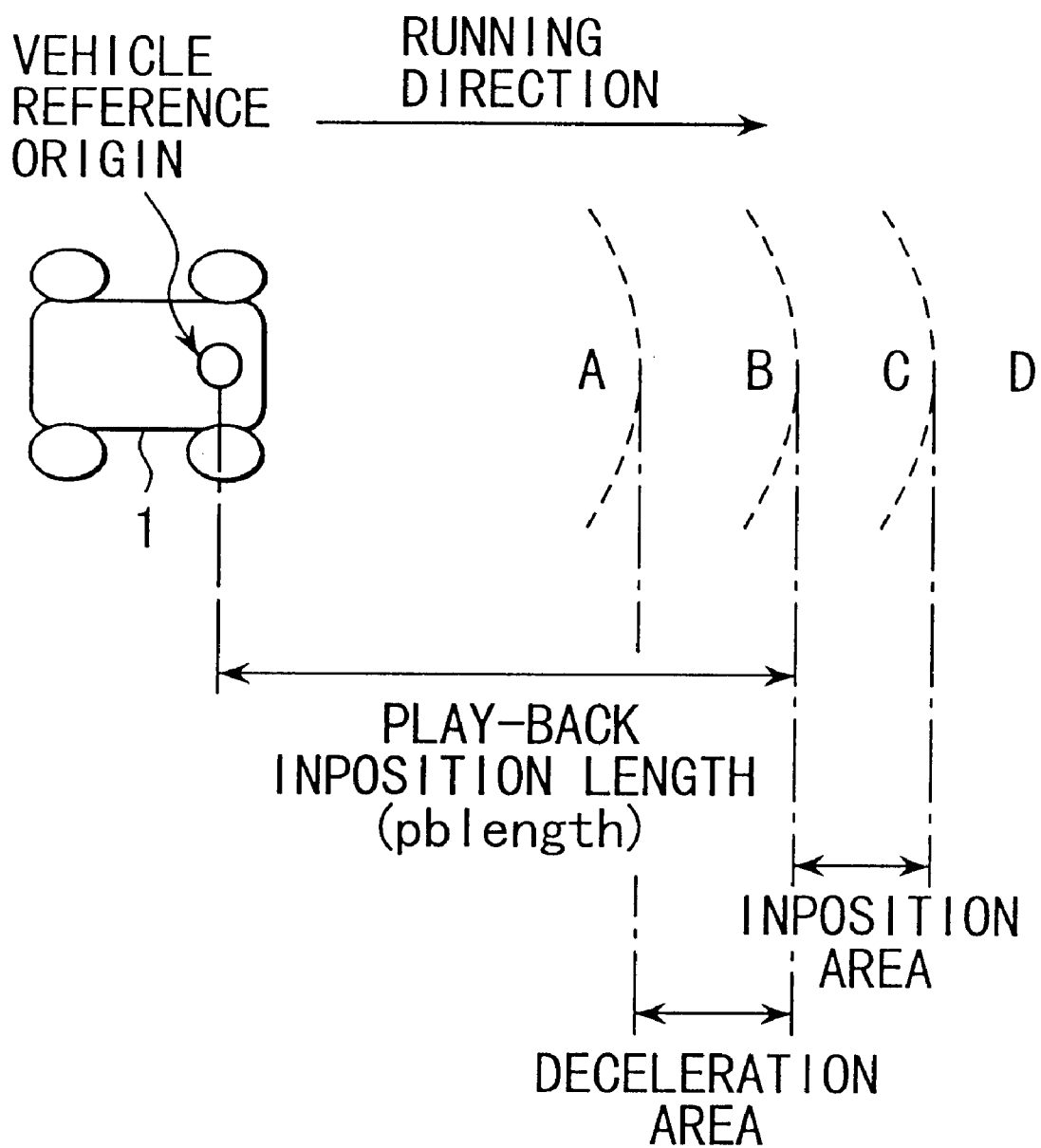
FIG. 9 is an explanatory view showing areas where a virtual traction point is located.

Then, the program goes to a step S206 where it is judged which areas the calculated virtual traction point VTP (t) belongs to, areas A, B, C or D, as shown in FIG. 9. According to the result of the judgment, the vehicle speed is controlled so as to regulate the advancing of the play-back pointer t.

That is, although the play-back pointer t for playing-back the teaching data should be advanced basically in real time, due to the deviation of the vehicle speed at playing-back, it is necessary to control the HST pedal and regulate the advancing of the play-back pointer t.

The area C (or inposition area) is defined as one having an allowance of the width "pbinpos" ahead of a reference position away from the vehicle reference origin by the inposition distance "pblength" in the vehicle running direction. The area D is defined as one farther than the inposition area, the area B (or deceleration area) is defined as one having an allowance of the width "pbstop" inside of the inposition area and the area A is defined as one located inside of the area B and nearest to the vehicle 1.

Further, when the virtual traction point VTP (t) which is calculated from the data at teaching is located in the area A, the program goes to a step S207 and when located in the area B, the program goes to a step S209. Further, when the virtual traction point VTP (t) is located in the area C, the program goes to a step S211 and when located in the D, the program goes to S213.

That is, when the virtual traction point VTP(t) is located in the area A, since it is judged that the current position of the vehicle 1 is too close to the virtual traction point VTP (t) and accordingly the current position of the vehicle largely goes beyond the position at teaching, at the step S207 the vehicle speed is set to 0 to stop the vehicle forcedly. Further, the program goes to a step S208 where the control time pointer (play-back pointer) t is advanced by a specified value and then goes to a step S215. Generally, since the play-back pointer t is advanced every control interval pbtime, in this case the play-back pointer t is advanced by 1.

When the virtual traction point VTP(t) is located in the area B, it is judged that the current position of the vehicle 1, although it is close to the virtual traction point VTP(t), goes beyond the position at teaching and at a step S209 the vehicle 1 is decelerated by a predetermined rate (one step amount of the HST pedal angle) pbacc by operating the HST pedal angle. In this case, the minimum speed obtained by deceleration is 0 and there is no reverse running. Further, at a step S210 the play-back pointer t is advanced by a specified value and the program goes to S215.

When the virtual traction point VTP(t) is located in the area C, it is judged that the current position of the vehicle 1 is substantially in the position at teaching and at a step S211 the current vehicle speed is retained. Further, at a step S212 the play-back pointer t is advanced by a specified value and the program goes to S215.

On the other hand, when the virtual traction point VTP(t) is located in the area D, it is judged that the current position of the vehicle 1 is away from the virtual traction point VTP (t) and has not reached the position at teaching and at a step S213 the HST pedal is operated to accelerate the vehicle 1 by a specified rate pbacc. Further, at a step S214 the play-back pointer t is retained as it is and the program goes to S215.

At the step S215, events in the cutter operation are played-back during the play-back running control of the vehicle. These events in the cutter operation are played-back at a control interval designated by the control time interval pbtime at playing-back and the cutter operation is controlled differently for the kind of the events. When the noncontact type sensors 8a, 8b and the contact type sensors 9a, 9b detect an obstacle, the operation of the cutter 2 is immediately stopped and at the same time the vehicle is stopped. When the obstacle is detected again after a specified time elapses, an alarm is issued and the engine is stopped.

After that, the program goes to a step S216 where it is checked whether or not the teaching data reaches an end mark, i.e., the teaching data comes to an end. As a result, if the teaching data does not come to an end, at a step S217 it is checked whether or not it reaches a next control time. If it is not yet a next control time, the program waits for the next execution at a step S217. When it reaches a next control time, the program returns to a step S202 and continues the same processes.

Then, the running traces and the events of the cutter operation are continued to be played-back and at S216 when the teaching data comes to an end, it is judged that the teaching data finishes and the program leaves the play-back mode.

Figure 10:
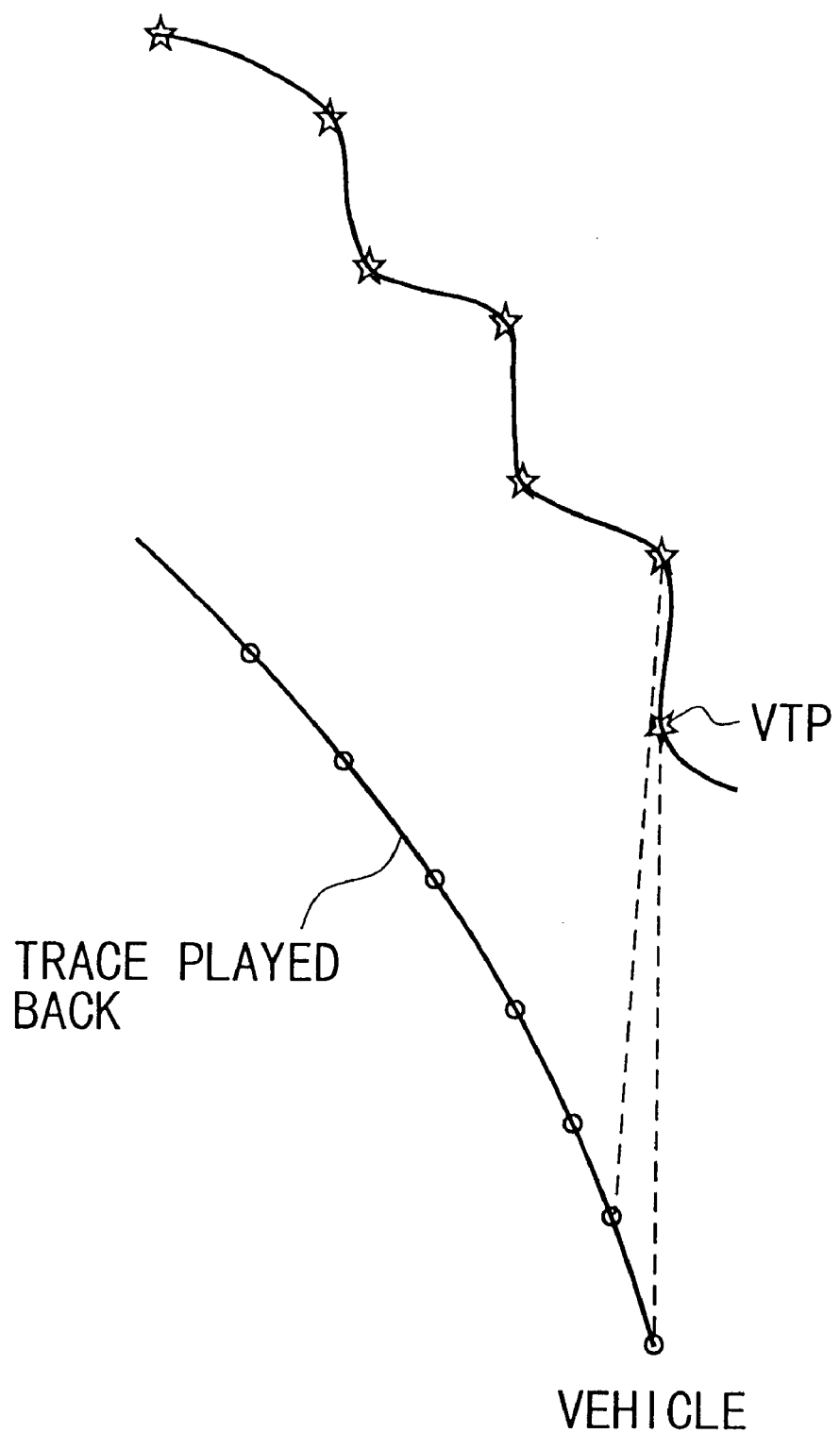
FIG. 10 is an explanatory view showing a trace of a vehicle at a play-back running.
Figure 11:
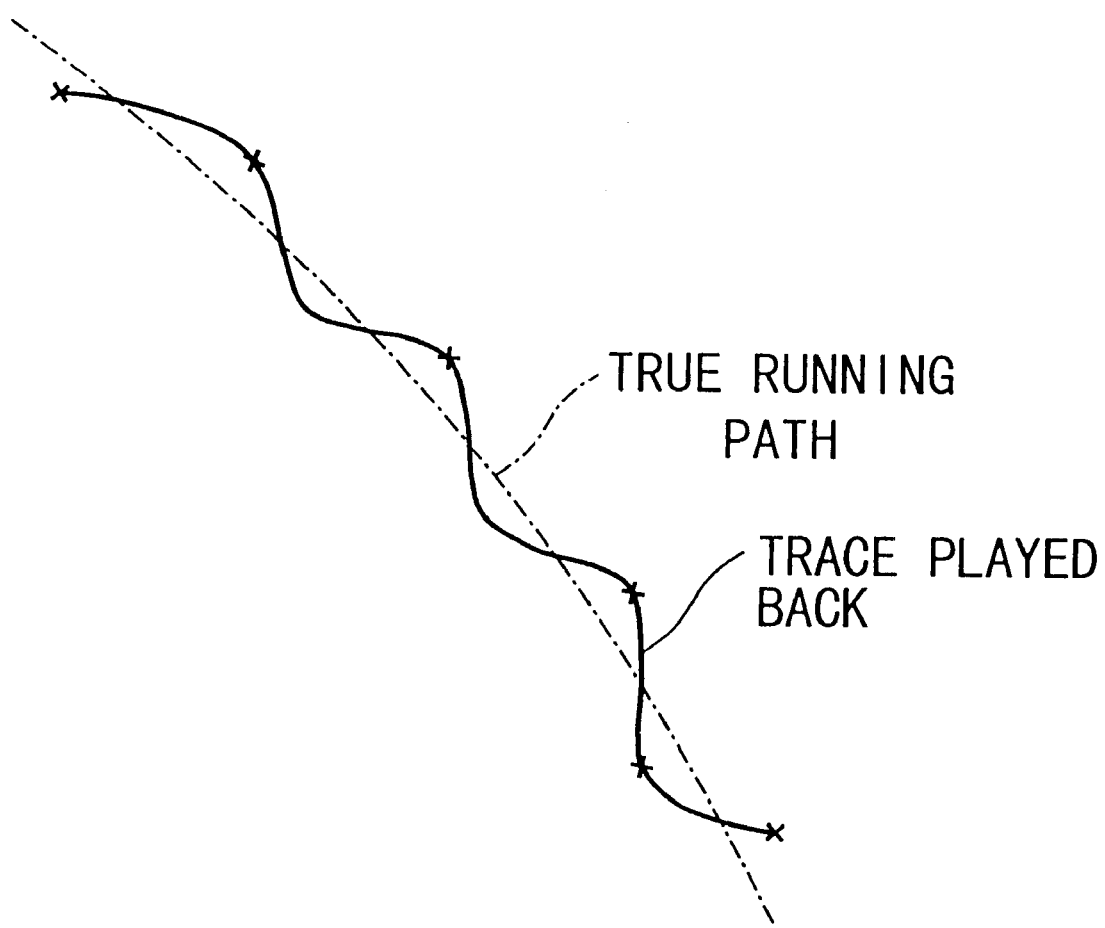
FIG. 11 is an explanatory view showing a trace of a vehicle according to a prior art.

FIG. 10 shows an example of a play-back of a running path subjected to the teaching process. Since when the mowing vehicle 1 is attracted by the virtual traction point VTP located away from the vehicle 1 by a specified distance, an equivalent steering and speed control are performed. Accordingly, there are no such defects that the detection errors of the vehicle position and the vehicle azimuth are amplified and appear in the play-back traces. Even when the position of the virtual traction point VTP id dispersed due to the detection error of the vehicle position, the dispersion on the vehicle side is reduced by the traction length or so-called lever ratio, thereby the steering stability can be improved.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A control apparatus for an autonomous running vehicle, comprising:
   a first control system with a teaching mode for manually operating said vehicle by memorizing a vehicle position to obtain a memorized vehicle position and a vehicle azimuth to obtain a memorized vehicle azimuth corresponding to a point on a running path of said vehicle and for generating a teaching data signal; and
   a second control system with a play-back mode for autonomously tracing said running path based on said teaching data signal, said second control system having:
      virtual traction point establishing means responsive to said teaching data signal for establishing a virtual traction point located away from said memorized vehicle position by a specified distance in a direction of said memorized vehicle azimuth and for outputting a virtual traction point signal,
      current vehicle position determining means for determining a current vehicle position and for producing a current vehicle position signal,
      target azimuth calculating means responsive to said current vehicle position signal and said virtual traction point signal for calculating a target azimuth based on a positional relationship between said current vehicle position and said virtual traction point and for transmitting a target azimuth signal,
      vehicle steering means responsive to said target azimuth signal for steering said vehicle so as to obtain said target azimuth and for producing a steering signal, and
      vehicle speed control means responsive to said steering signal for controlling vehicle speed so as to keep a distance between said virtual traction point and said vehicle within a specified range and to correctly follow said running path without deviating therefrom.

2. A control method for an autonomous running vehicle having a first control system with a teaching mode for manually operating said vehicle by memorizing a vehicle position to obtain a memorized vehicle position and a vehicle azimuth to obtain a memorized vehicle azimuth corresponding to a point on a running path for said vehicle and for generating a teaching data signal, and a second control system with a play-back mode for autonomously tracing said running path based on said teaching data signal, the method comprising:
   establishing a virtual traction point located away from said memorized vehicle position by a specified distance in a direction of said memorized vehicle azimuth;
   determining a current vehicle position;
   calculating a target azimuth based on a positional relationship between said current vehicle position and said virtual traction point;
   steering said vehicle so as to obtain said target azimuth; and
   controlling vehicle speed so as to keep a distance between said virtual traction point and said vehicle within a specified range, and to correctly follow said running path without deviating therefrom.

3. The control apparatus according to claim 1, wherein:
   said vehicle speed control means controls said vehicle speed based on said distance, when said distance is lower than said specified range within a predetermined range, said vehicle speed control means decelerates said vehicle speed.

4. The control apparatus according to claim 3, wherein:
   when said distance is lower than said predetermined range, said vehicle speed control means stops said vehicle.

5. The control apparatus according to claim 1, wherein:
   said vehicle speed control means controls said vehicle speed based on said distance, when said distance is farther than said specified range within a predetermined range, said vehicle speed control means accelerates said vehicle speed.

6. A control apparatus for an autonomous running vehicle, comprising:
   memory for memorizing a vehicle position to obtain a memorized vehicle position and vehicle azimuth to obtain a memorized vehicle azimuth at a point on a running path of said vehicle;
   virtual traction point setting means for setting a virtual traction point, said virtual traction point being located away from said memorized vehicle position by a specified distance in a direction of said memorized vehicle azimuth; and
   control means for controlling steering and running speed of said vehicle, with respect to said virtual traction point, so as to perform steering and running speed control equivalent to said vehicle being attracted by said virtual traction point.

7. The control apparatus according to claim 6, wherein:
   said control means includes
      current vehicle position determining means for determining a current vehicle position,
      target azimuth calculating means for calculating a target azimuth based on said current vehicle position and said virtual traction point,
      vehicle steering means for steering said vehicle in a direction of said target azimuth, and
      vehicle speed control mans for controlling vehicle running speed so as to keep a distance between said virtual traction point and said vehicle within a specified range.

8. The control apparatus according to claim 6, wherein:
   said memory memorizes said vehicle position and said vehicle azimuth when said vehicle is manually operated on said running path, and
   said control means controls said steering and said running speed while said vehicle is autonomously operated so as to trace said running path.

9. A control apparatus for an autonomous running vehicle, comprising:
   means for memorizing a vehicle position to obtain a memorized vehicle position and a vehicle azimuth to obtain a memorized vehicle azimuth at a point on a running path of the vehicle;
   means for establishing a virtual traction point located away from the memorized vehicle position by a specified distance in a direction of the memorized vehicle azimuth;

means for determining a current vehicle position;

means for calculating a target azimuth based on the current vehicle position and the virtual traction point, means for steering the vehicle to obtain the calculated target azimuth; and means for controlling vehicle speed so as to keep a distance between the virtual traction point and the vehicle within a specified range within a predetermined range, to thereby follow the running path without substantially deviating therefrom.

10. A method for controlling an autonomous running vehicle, comprising:

memorizing a vehicle position to obtain a memorized vehicle position and a vehicle azimuth to obtain a memorized vehicle azimuth at a point on a running path of the vehicle;

establishing a virtual traction point located a specified distance away from a memorized vehicle position in a direction of a memorized vehicle azimuth;

determining a current vehicle position;

calculating a target azimuth based on the current vehicle position and the virtual traction point;

steering the vehicle so as to obtain the target azimuth; and controlling a speed of the vehicle so as to keep a distance between the virtual traction point and the position of the vehicle within a specified range within a predetermined range.

11. The control apparatus according to claim 9, wherein the means for controlling the vehicle speed is responsive to a distance measured between the virtual traction point and the vehicle.

12. The control apparatus according to claim 9, wherein the means for controlling the vehicle speed acts to:

decrease the vehicle speed when the distance is below the specified range;

increase the vehicle speed when the distance is above the specified range;

maintain the vehicle speed when the distance is within the specified range; and to stop the vehicle when the distance is below the predetermined range.

13. A control apparatus for an autonomous running vehicle, comprising:

means for memorizing a vehicle position to obtain a memorized vehicle position and a vehicle azimuth to obtain a memorized vehicle azimuth at a point on a running path of the vehicle;

means for setting a virtual traction point located away from the memorized vehicle position by a specified distance in a direction of the memorized vehicle azimuth; and means for controlling steering and speed of the vehicle, with respect to the virtual traction point, so as to perform steering and running speed control to thereby follow the running path without substantially deviating therefrom.

14. The control apparatus according to claim 13, wherein the means for controlling steering and speed of the vehicle includes:

means for determining a current vehicle position;

means for calculating a target azimuth based on the current vehicle position and the virtual traction point, means for steering the vehicle in the direction of the target azimuth, and means for controlling vehicle running speed so as to keep a distance between the virtual traction point and the vehicle within a specified range.

15. The control apparatus according to claim 13, wherein:

the means for memorizing memorizes the vehicle position and the vehicle azimuth when the vehicle is manually operated on the running path, and the means for controlling the steering and the speed of the vehicle controls the steering and the speed while the vehicle is autonomously operated, so as to trace the running path.

* * * * *